United States Patent
Laackmann

(10) Patent No.: US 9,626,615 B2
(45) Date of Patent: Apr. 18, 2017

(54) CHIP CARD AND CHIP CARD SLEEVE

(71) Applicant: Infineon Technologies AG, Neubiberg (DE)

(72) Inventor: Peter Laackmann, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/824,133

(22) Filed: Aug. 12, 2015

(65) Prior Publication Data

US 2016/0048749 A1    Feb. 18, 2016

(30) Foreign Application Priority Data

Aug. 12, 2014   (DE) .................. 10 2014 111 487

(51) Int. Cl.
| | |
|---|---|
| G06K 19/00 | (2006.01) |
| G06K 19/077 | (2006.01) |
| G06K 19/07 | (2006.01) |
| G06K 19/073 | (2006.01) |

(52) U.S. Cl.
CPC ..... *G06K 19/07701* (2013.01); *G06K 19/073* (2013.01); *G06K 19/0723* (2013.01); *G06K 19/07354* (2013.01); *G06K 19/07716* (2013.01); *G06K 19/07749* (2013.01); *G06K 19/07769* (2013.01); *G06K 19/07794* (2013.01)

(58) Field of Classification Search
USPC ........ 235/435, 439, 449, 451, 487, 492, 493
See application file for complete search history.

(56) References Cited

U.S. PATENT DOCUMENTS

| | | | | |
|---|---|---|---|---|
| 6,069,970 A | * | 5/2000 | Salatino | G06K 9/0012 235/380 |
| 2002/0170974 A1 | * | 11/2002 | Kashima | G06K 19/005 235/492 |
| 2005/0281441 A1 | * | 12/2005 | Martinsen | A61B 5/0531 382/124 |
| 2014/0258531 A1 | * | 9/2014 | Sarda | H04B 5/0031 709/225 |

\* cited by examiner

*Primary Examiner* — Matthew Mikels
(74) *Attorney, Agent, or Firm* — Viering, Jentschura & Partner mbB

(57) ABSTRACT

According to one embodiment, a chip card is provided, having a first contact area and a second contact area, a measuring circuit that is configured to measure an impedance between the first contact area and the second contact area and a control circuit that is configured to take the measured impedance as a basis for configuring a function of the chip card.

20 Claims, 5 Drawing Sheets

CHIP CARD AND CHIP CARD SLEEVE

CROSS-REFERENCE TO RELATED APPLICATION

This application claims priority to German Patent Application Serial No. 10 2014 111 487.6, which was filed Aug. 12, 2014, and is incorporated herein by reference in its entirety.

TECHNICAL FIELD

Various embodiments relate generally to a chip card and a chip card sleeve.

BACKGROUND

Chip cards are increasingly used, for example for cashless payment at appropriate terminals. For reasons of security, inter alia, it may be desirable for a user to configure his chip card, for example to deactivate particular functions, such as cashless payment. Accordingly, mechanisms that easily allow a user to configure a chip card are desirable.

SUMMARY

According to one embodiment, a chip card is provided, having a first contact area and a second contact area, a measuring circuit that is configured to measure an impedance between the first contact area and the second contact area and a control circuit that is configured to take the measured impedance as a basis for configuring a function of the chip card.

According to a further embodiment, a chip card sleeve having a sleeve that forms a cavity for holding a chip card and having a first contact and a second contact that extend into the cavity is provided, wherein the first contact and the second contact are electrically conductively connected to one another.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in such detail that a person skilled in the art can implement the invention. Other embodiments are also possible and the embodiments can be modified in structural, logical and electrical respects without departing from the subject matter of the invention. The various embodiments are not necessarily mutually exclusive but rather it is possible for various embodiments to be combined with one another, so that new embodiments are obtained. In the course of this description, the terms "connected" and "coupled" describe both direct and indirect connections and direct or indirect coupling.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
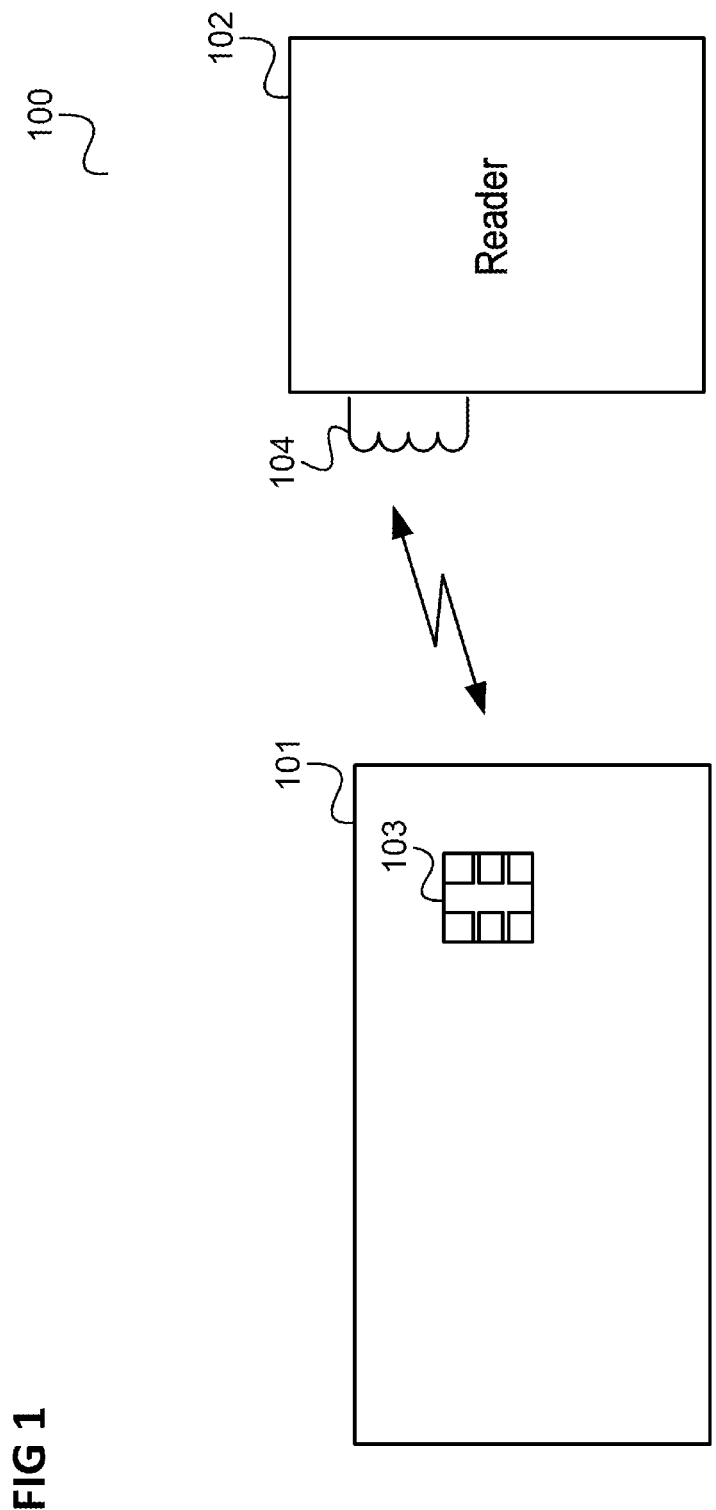
FIG. 1 shows a communication arrangement according to an embodiment.

FIG. 1 shows a communication arrangement 100 according to an embodiment.

The communication arrangement 100 has a chip card 101 and a reader 102 (which is also referred to as a contactless reader).

The chip card 101 has a chip card module 103 that can communicate with the reader 102 by radio, which is subsequently also referred to as (contactless) communication via a contactless interface. Accordingly, a chip card that is set up for contactless communication is referred to as a contactless chip card. The communication is NFC (near field communication) communication, for example.

To this end, the chip card module 103 has an antenna (coil on chip), for example. The chip card 101 may also be additionally equipped with a booster antenna, which serves as an amplifier between the antenna of the chip card module 103 and an antenna 104 of the reader.

The chip card may also be a dual interface card, i.e. be equipped not only with the contactless interface but also additionally with a contact-based interface.

Contactless chip cards and dual interface cards are used in large volumes today. Usually, the user of such a chip card is not able to reconfigure the chip card while carrying such a chip card on him, however. This may be desirable, however. By way of example, the user crosses the border of a country and wishes to switch a particular function of the chip card on or off. Further examples are that the user takes the chip card into a densely populated area and wishes to prevent a particular contactless function from being activatable without his knowledge. It may also be the case that the user wishes to be able to choose between two very similar functions that cannot be chosen on a reader (e.g. a corresponding terminal), for example (in a similar manner to the case of a dual SIM card in a mobile telephone).

(Re)programming or (re)configuration of the chip card could be achieved by the user by a mobile telephone that supports NFC communication and an appropriate application, for example. This requires the user to have an appropriate device, however.

When contactless chip cards are used for authorization or payment processes, it is typically necessary to balance out security and convenience: If no additional security function (PIN input, fingerprint or the like) and no "expression of intention" are used, then handling is very convenient for the user. He normally does not even need to remove the chip card from his wallet. However, it is easy for very simple attacks to be carried out in order to steal from the bearer of the card or to use the chip card illegally for illegitimate entry and the like. To this end, an attacker can either use a genuine merchant terminal, which he converts for mobile operation, or use what is known as a relay attack, which involves the radio link between a genuine merchant terminal and the attacked chip card being artificially extended by a radio connection (for example a mobile radio connection, e.g. a GSM connection). In both cases, the chip card can be accessed from a short distance without the knowledge of the user.

In order to avoid such an attack, the user may be required to interact with the terminal and this can involve information being requested, for example, that is not available to the attacker (e.g. a PIN or a fingerprint). In addition, provision may be made for the chip card to be activated only when the payment or authentication process is meant to take place.

In addition, a protective sleeve can be used that blocks the electromagnetic field of a terminal (and also of an attacker). In this case, the user first needs to remove the card from the protective sleeve before said card can be activated and used, which, since this is necessary for every payment process, means a certain effort for the user.

It is additionally possible for the electromagnetic field that is used for communication with the chip card to be actively disturbed by a jamming transmitter. This constantly requires power, however. In addition, a push switch can be integrated into the chip card, so that the user can activate the chip card by pushing on a particular point. However, this requires moving parts, which results in an expensive design and possible reliability problems under mechanical stress, and also the possible penetration of moisture and oxygen into the switching elements.

Embodiments are described below that provide an opportunity for configuration of a chip card, for example the activation of a function such as cashless payment, which is convenient for the user and does not require an additional (electronic) device.

Figure 2:
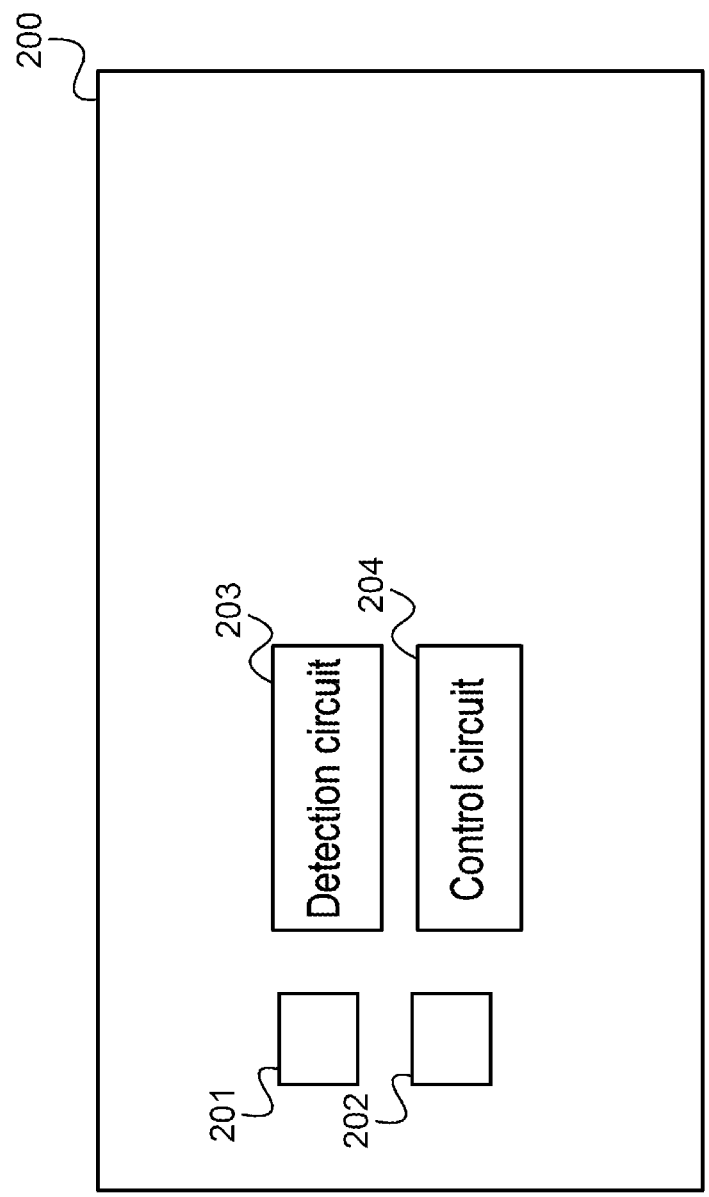
FIG. 2 shows a chip card according to an embodiment.

FIG. 2 shows a chip card 200 according to an embodiment.

The chip card 200 has a first contact area 201 and a second contact area 202 and also a measuring circuit 203 that is configured to measure an impedance between the first contact area 201 and the second contact area 202.

The chip card 200 additionally has a control circuit 204 that is configured to take the measured impedance as a basis for configuring a function of the chip card.

In other words, a function of a chip card is configured (e.g. activated or deactivated) on the basis of a (nonreactive, capacitive and/or inductive) resistance between two contact areas. A user can therefore configure the function by influencing the resistance between the contact areas. In one embodiment, the contact areas are intended to be understood to mean the surface contacts (e.g. gold contacts) or pads of the chip card module.

By way of example, the first and second contact areas used can be pads of the chip card module that are generally unused or are at least unused in contactless mode.

This can be used particularly efficiently for dual interface chip cards, since in this case no additional components of any kind are required and only an appropriate circuit in the chip card module allows provision.

By way of example, the control circuit is set up to configure the function of the chip card on the basis of whether the measured impedance is above a prescribed threshold value.

In this case, the measurement of the impedance is the comparison with the prescribed threshold value, for example.

According to one embodiment, the impedance is the nonreactive resistance between the first contact area and the second contact area, the capacitive resistance between the first contact area and the second contact area, the inductive resistance between the first contact area and the second contact area or a combination thereof.

According to one embodiment, the impedance is the nonreactive resistance between the first contact area and the second contact area, and the control circuit is set up to configure the function of the chip card on the basis of whether the first contact area and the second contact area are electrically conductively connected to one another.

According to one embodiment, the impedance is the nonreactive resistance between the first contact area and the second contact area, and the control circuit is set up to configure the function of the chip card on the basis of whether the first contact area and the second contact area are electrically connected to one another at least by a human finger.

According to one embodiment, the control circuit is set up to take the measured impedance as a basis for activating a function of the chip card.

By way of example, the chip card has a contactless interface, wherein the function is a function of the contactless interface.

By way of example, the function is a payment using the contactless interface.

According to one embodiment, the chip card has a chip card module, wherein the first contact area, the second contact area, the measuring circuit and the control circuit are part of the chip card module.

By way of example, the first contact area and the second contact area are arranged on an exposed surface of the chip card module.

The first contact area and the second contact area are contact pads of the chip card module, for example.

According to one embodiment, the chip card has at least one further contact area and a further measuring circuit that is set up to measure an impedance between the first contact area and the at least one further contact area. The control circuit is set up to take the measured impedances as a basis for configuring the function of the chip card.

According to one embodiment, the chip card has at least two further contact areas and a further measuring circuit that is set up to measure an impedance between the further contact areas. The control circuit is set up to take the measured impedances as a basis for configuring the function of the chip card.

The chip card is a dual interface chip card, for example.

Embodiments are explained more precisely below.

In the example described below, the contact areas are used as touch keys for initiating a payment process (i.e. as an expression of intention from the user). Conversely, the user can prevent the initiation of a payment, when he does not wish to use the chip card for payment, by not touching the contact areas. Provision may also be made for this protective mechanism to be used only from a particular amount of money upwards, since it requires the user to touch the card.

Figure 3:
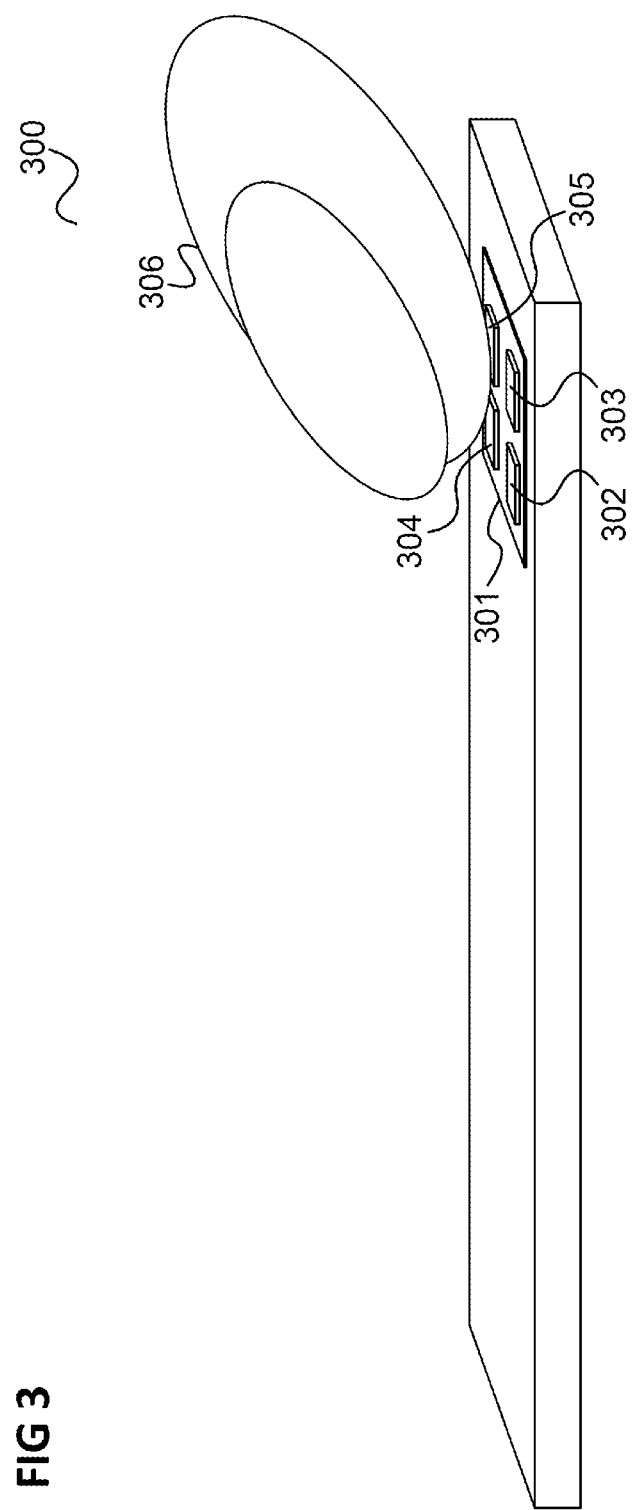
FIG. 3 shows a chip card according to an embodiment.

FIG. 3 shows a chip card 300 according to an embodiment.

The chip card 300 corresponds to the chip card 101, for example, and has a chip card module 301 corresponding to the chip card module 103. The chip card 300 is a dual interface card, for example.

The chip card module 301 has a plurality of contact areas 302 to 305. In this example, four contact areas 302 to 305 are shown, but the chip card module 301 can have further contact areas. The contact areas correspond to the pads of the contact panel of the chip card module 301, for example.

The chip of the chip card module 301 of the chip card contains a circuit that, in contactless mode, ascertains the electrical resistance between two contact areas, for example the rear two contact areas 304, 305.

If the resistance is above a certain threshold value (for example approximately 1 megaohm), the circuit does not allow a payment using the contactless interface.

If the ascertained electrical resistance indicates the presence of a finger 306 on the chip card module 301, however, the circuit allows the payment and the chip card module carries out appropriate communication with the reader (e.g. terminal). Instead of the nonreactive resistance, the circuit can also measure the capacitive properties between the contact areas.

A user can accordingly place his finger on the chip card module 301 and in that way accept payment. The detection of the finger in contact can be made by pads that are generally unused or pads that are unused specifically in contactless mode (or both) on the chip card module 301.

By way of example, in order to detect whether the user places his finger on the chip card module 301, in the case of a 6-pin module (i.e. a chip card module having six contacts) it is possible to measure the resistance of the pad C6 against the pad GND or against the pad Vcc in contactless mode. In this case, a connection for the pad C6 in the chip card module and a circuit for measuring the resistance, which circuit is connected to these pads, are provided, for example.

It is also possible to use other pads for detecting whether the user places his finger on the chip card module 301, for example including pads that are used in contactless mode. In this case too, a circuit is provided in the chip card module that is connected to these pads and measures the resistance (or generally an impedance such as resistance, capacitance, inductance or a combination thereof) between the pads.

As an alternative or in addition to the user placing his finger on the chip card module 301, and this being detected, provision may also be made for the user to use a card sleeve (protective sleeve) that electrically conductively connects individual pads of the chip card module 301 to one another when the chip card 300 is inserted. When the card is used (in the sleeve), the chip of the chip card module recognizes the connection of the pads and performs appropriate configuration and executes an appropriately configured function, for example.

Figure 4:
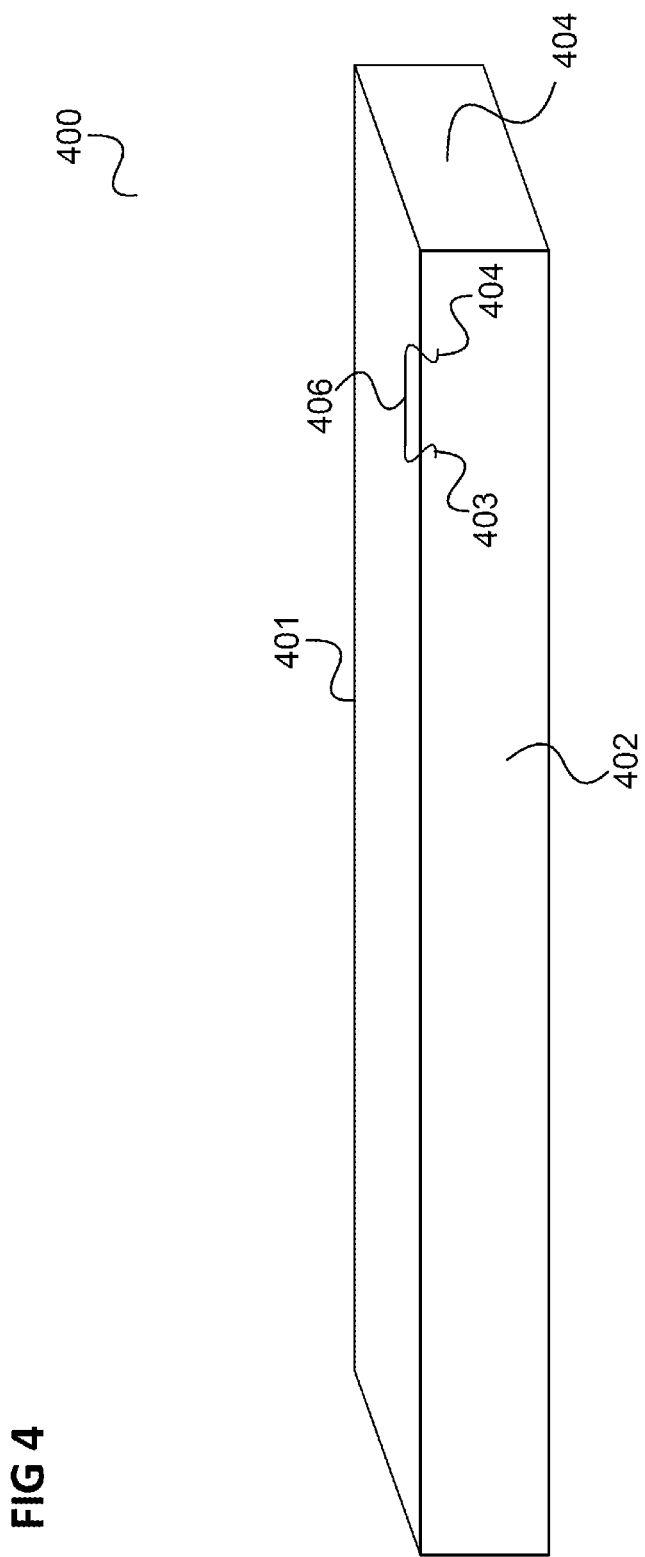
FIG. 4 shows a chip card sleeve according to an embodiment.

An example of a chip card protective sleeve that has an electrical connecting element that connects at least two of the contact pads of the chip card 300 to one another is shown in FIG. 4.

FIG. 4 shows a chip card sleeve 400 according to an embodiment.

The chip card sleeve 400 has a sleeve 401 that forms a cavity 402 for holding a chip card.

The chip card sleeve 400 additionally has a first contact 403 and a second contact 404 that extend into the cavity 402. The first contact and the second contact are electrically conductively connected to one another.

According to one embodiment, the first contact and the second contact are embodied, electrically conductively connected and arranged in the sleeve such that when a chip card has been introduced into the chip card sleeve they electrically conductively connect two contact areas of the chip card to one another.

According to one embodiment, the first contact and the second contact electrically conductively connect the contact areas of the chip card to one another when the chip card has been introduced into the chip card sleeve in a first manner, and the chip card sleeve additionally has a third contact and a fourth contact that are embodied, electrically conductively connected and arranged in the sleeve such that when the chip card has been introduced into the chip card sleeve in a second manner they electrically conductively connect two other contact areas of the chip card to one another. By way of example, the first manner and the second manner are distinguished by which side of the chip card has been introduced first and/or which side of the chip card is at the top.

The contacts are spring contacts, for example.

By way of example, the sleeve 401 is made of plastic, such as polycarbonate, and has an opening 405 for inserting a chip card into the sleeve 401, for example.

The contacts 403, 404 together with their electrical connection form a connecting element 406. In one embodiment, the connecting element has two electrically connected contact springs (in other words spring-loaded contacts) as contacts 403, 404, which are arranged such that they connect two pads of the contact panel of the chip card module 301 to one another. This is shown in FIG. 5.

Figure 5:
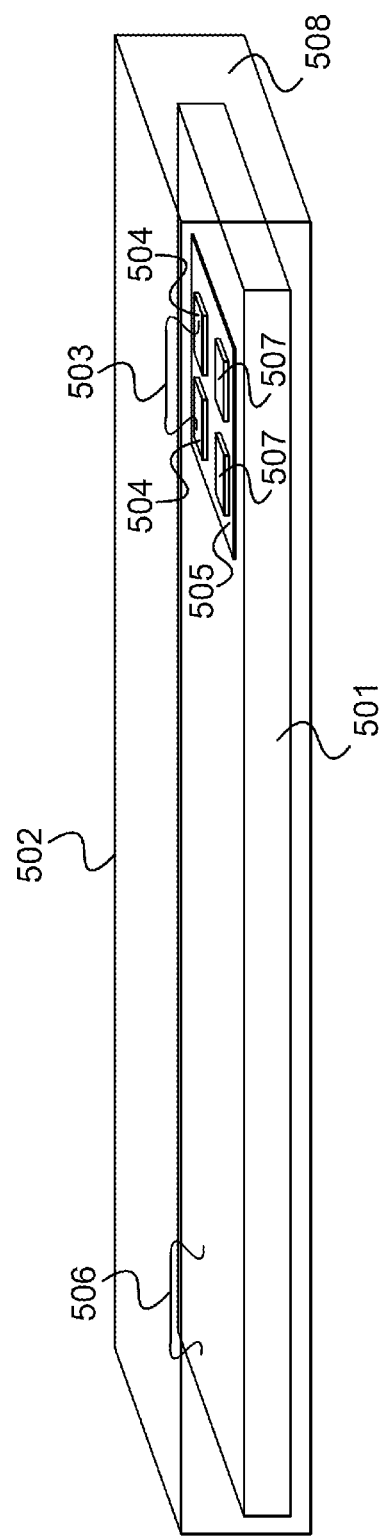
FIG. 5 shows a chip card that is in a chip card protective sleeve according to an embodiment.

FIG. 5 shows a chip card 501 that is in a chip card protective sleeve 502 according to an embodiment.

The chip card 501 corresponds to the chip card 301, for example.

The chip card protective sleeve 502 has a connecting element 503 corresponding to the connecting element 406. When the chip card 501 is in the chip card protective sleeve 502, as shown, the connecting element 503 connects the two rear contact areas 504 of the chip card module 505.

By way of example, the user inserts the chip card 501 into the protective sleeve 502, so that a conductive connection is set up between the two rear contact areas (pads) 504. The chip card module 505 contains a circuit that detects that there is a conductive connection between the two contact areas 504. The circuit performs or allows a particular function of the chip card 501, for example when the chip card 501 is activated by an electromagnetic field on a contactless terminal.

In this example, the protective sleeve 502 has a further connecting element 506 that, by way of example, is arranged such that it connects the front two contact areas 507 of the chip card module 505 when the chip card is pushed into the protective sleeve through the opening 508 with the chip card module (at the top) first.

According to one embodiment, the chip card module 505 contains a circuit that also ascertains the resistance (or generally an impedance) between the front two contact areas 507 and, depending on which of the contact areas are connected, prompts different configurations.

Accordingly, the user can achieve different configuration depending on how he pushes the chip card 501 into the protective sleeve 502.

There may also be further connecting elements in place, so that the user can set still further configurations.

By way of example, the protective sleeve can have a connecting element at the top and bottom and on the right and left, said connecting elements being embodied and arranged such that they connect different contact areas of the chip card module 505, so that a circuit in the chip card module, which circuit detects which contact areas are connected, can distinguish the following cases:

(1) chip card has not been pushed in;

(2) chip card has been pushed in with chip card module at the top and with chip card module first;

(3) chip card has been pushed in with chip card module at the top and with chip card module last;

(4) chip card has been pushed in with chip card module at the bottom and with chip card module first (for example a connecting element on the lower inside of the chip card sleeve then connects a front contact area to a rear contact area);

(5) chip card has been pushed in with chip card module at the bottom and with chip card module last.

Depending on the case detected, the circuit prompts different configuration of the chip card, so that the user can set one of five different configurations solely by the chip card protective sleeve 502.

By way of example, the protective sleeve 502 can have appropriate prints (e.g. pictograms) that indicate the corresponding configuration, so that the user can tell how he needs to insert the chip card 501 into the chip card protective sleeve 502 in order to achieve a particular configuration.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip card, comprising:
a first contact area and a second contact area;
a measuring circuit that is configured to measure an impedance between the first contact area and the second contact area;
a control circuit that is configured to take the measured impedance as a basis for configuring a function of the chip card; and
a chip card module configured to communicate with another device,
wherein the control circuit is set up to configure the function of the chip card on the basis of whether the measured impedance is above a prescribed threshold value,
wherein the prescribed threshold value is at least about 1 mega ohm.

2. The chip card of claim 1,
wherein the measurement of the impedance is the comparison with the prescribed threshold value.

3. The chip card of claim 1,
wherein the impedance is the nonreactive resistance between the first contact area and the second contact area, the capacitive resistance between the first contact area and the second contact area, the inductive resistance between the first contact area and the second contact area or a combination thereof.

4. The chip card of claim 1,
wherein the impedance is the nonreactive resistance between the first contact area and the second contact area, and the control circuit is set up to configure the function of the chip card on the basis of whether the first contact area and the second contact area are electrically conductively connected to one another.

5. The chip card of claim 1,
wherein the impedance is the nonreactive resistance between the first contact area and the second contact area, and the control circuit is set up to configure the function of the chip card on the basis of whether the first contact area and the second contact area are electrically connected to one another at least by a human finger.

6. The chip card of claim 1,
wherein the control circuit is configured to take the measured impedance as a basis for activating a function of the chip card.

7. The chip card of claim 1, further comprising:
a contactless interface, wherein the function is a function of the contactless interface.

8. The chip card of claim 7,
wherein the function is a payment using the contactless interface.

9. The chip card of claim 1, further comprising:
a chip card module, wherein the first contact area, the second contact area, the measuring circuit and the control circuit are part of the chip card module.

10. The chip card of claim 9,
wherein the first contact area and the second contact area are arranged on an exposed surface of the chip card module.

11. The chip card of claim 9,
wherein the first contact area and the second contact area are contact pads of the chip card module.

12. The chip card of claim 1, further comprising:
at least one further contact area and a further measuring circuit that is configured to measure an impedance between the first contact area and the at least one further contact area, wherein the control circuit is configured to take the measured impedances as a basis for configuring the function of the chip card.

13. The chip card of claim 1, further comprising:
at least two further contact areas and a further measuring circuit that is configured to measure an impedance between the further contact areas, wherein the control circuit is configured to take the measured impedances as a basis for configuring the function of the chip card.

14. The chip card of claim 1,
wherein the chip card is a dual interface chip card.

15. The chip card of claim 1, wherein the chip card does not have an internal power source.

16. The chip card of claim 15, wherein the chip card module comprises a near field communication (NFC) antenna.

17. The chip card of claim 16, wherein the NFC antenna is configured to transform an electromagnetic field received at the chip card from an external device into power for the chip card.

18. A chip card, comprising:
a first contact area and a second contact area;
a measuring circuit that is configured to measure an impedance between the first contact area and the second contact area;
a control circuit that is configured to take the measured impedance as a basis for configuring a function of the chip card; and
a chip card module configured to communicate with another device,
wherein the impedance is the nonreactive resistance between the first contact area and the second contact area, the capacitive resistance between the first contact area and the second contact area, the inductive resistance between the first contact area and the second contact area or a combination thereof, and
wherein the chip card does not have an internal power source.

19. The chip card of claim 18, wherein the chip card module comprises a near field communication (NFC) antenna.

20. The chip card of claim 19, wherein the NFC antenna is configured to transform an electromagnetic field received at the chip card from an external device into power for the chip card.

* * * * *